(12) United States Patent
Dong

(10) Patent No.: US 12,127,260 B2
(45) Date of Patent: Oct. 22, 2024

(54) RANDOM ACCESS METHOD AND APPARATUS, SYSTEM, AND STORAGE MEDIUM

(71) Applicant: BEIJING XIAOMI MOBILE SOFTWARE CO., LTD., Beijing (CN)

(72) Inventor: Xiandong Dong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 498 days.

(21) Appl. No.: 17/595,645

(22) PCT Filed: May 28, 2019

(86) PCT No.: PCT/CN2019/088854
§ 371 (c)(1),
(2) Date: Nov. 19, 2021

(87) PCT Pub. No.: WO2020/237509
PCT Pub. Date: Dec. 3, 2020

(65) Prior Publication Data
US 2022/0225420 A1    Jul. 14, 2022

(51) Int. Cl.
*H04W 74/0833* (2024.01)
*H04W 72/04* (2023.01)

(52) U.S. Cl.
CPC ....... *H04W 74/0833* (2013.01); *H04W 72/04* (2013.01)

(58) Field of Classification Search
CPC ............. H04W 74/0833; H04W 72/04; H04W 74/008; H04W 72/0446; H04W 72/0453;
(Continued)

(56) References Cited

U.S. PATENT DOCUMENTS

2012/0165058 A1    6/2012  Hwang
2013/0003604 A1    1/2013  Blankenship
(Continued)

FOREIGN PATENT DOCUMENTS

CN    104619036 A    5/2015
CN    107360628 A    11/2017
(Continued)

OTHER PUBLICATIONS

MediaTek Inc. "DraftCR on msg3 retransmission (section A.4.3.2.2.1, A.5.3.2.2.1, A.6.3.2.2.1, A.7.3.2.2.1)"3GPP TSG-RAN4 Meeting #90bis, R4-1903660, Apr. 8-Apr. 12, 2019.
(Continued)

*Primary Examiner* — Nizam U Ahmed
(74) *Attorney, Agent, or Firm* — Syncoda LLC; Feng Ma

(57) ABSTRACT

A random access method includes: a terminal receiving a system message sent by an access network device, the system message comprising first indication information and second indication information, the first indication information being used for indicating a first time-frequency resource for sending a preamble in an access message, and the second indication information being used for indicating a second time-frequency resource for sending a load in the access message; the terminal sending the preamble on the first time-frequency resource; and the terminal scrambling the load in the access message according to an RNTI, and sending the scrambled load on the second time-frequency resource.

20 Claims, 5 Drawing Sheets

(58) Field of Classification Search
CPC ......... H04W 72/0466; H04W 72/0473; H04W 74/006
See application file for complete search history.

(56) References Cited

U.S. PATENT DOCUMENTS

| | | | |
|---|---|---|---|
| 2016/0269163 A1* | 9/2016 | Wong | H04W 72/23 |
| 2018/0176753 A1* | 6/2018 | Kim | H04W 72/23 |
| 2018/0206272 A1 | 7/2018 | Maaref et al. | |
| 2019/0159261 A1 | 5/2019 | Jung et al. | |
| 2020/0281022 A1 | 9/2020 | Pelletier et al. | |
| 2020/0329503 A1 | 10/2020 | Da Silva et al. | |
| 2021/0345416 A1* | 11/2021 | Hu | H04W 74/0833 |

FOREIGN PATENT DOCUMENTS

| | | |
|---|---|---|
| CN | 108633009 A | 10/2018 |
| CN | 109392180 A | 2/2019 |
| CN | 109495222 A | 3/2019 |
| EP | 3573402 A1 | 11/2019 |
| WO | 2018130081 A1 | 7/2018 |

OTHER PUBLICATIONS

LG Electronics. "RACH Procedure for Coverage Enhancement of MTC UEs."3GPP TSG RAN WG1#74Bis R1-134393., Oct. 11, 2013 (Oct. 11, 2013), pp. 1-3.

International Search Report in the international application No. PCT/CN2019/088854, mailed on Mar. 2, 2020.

English translation of the Written Opinion of the International Search Authority in the international application No. PCT/CN2019/088854, mailed on Mar. 2, 2020.

\* cited by examiner

RANDOM ACCESS METHOD AND APPARATUS, SYSTEM, AND STORAGE MEDIUM

CROSS-REFERENCE TO RELATED APPLICATION

This application is a U.S. national stage of International Application No. PCT/CN2019/088854 filed on May 28, 2019, the disclosure of which is hereby incorporated by reference in its entirety.

TECHNICAL FIELD

The present disclosure relates to the technical field of communications, and more particularly, to a random access method, apparatus and system, and a storage medium.

BACKGROUND

A terminal may establish a connection with an access network device in a random access manner, thereby implementing communication with a network through the access network device.

In a related art, an access network device broadcasts a system message to a terminal. The system message includes first indication information. The first indication information is configured to indicate a first time-frequency resource for sending a preamble. The terminal sends the preamble to the access network device on the first time-frequency resource. The access network device sends a Message 2 (msg2) to the terminal. The msg2 includes an index of a preamble monitored by the access network device, second indication information and a temporary Cell Radio Network Temporary Identifier (C-RNTI). The second indication information is configured to indicate a second time-frequency resource for sending a Message 3 (msg3). If the index in the msg2 indicates the preamble sent by the terminal, the terminal scrambles the msg3 using the temporary C-RNTI and sends the scrambled msg3 on the second time-frequency resource. The access network device sends a Message 4 (msg4) to the terminal. The terminal converts the temporary C-RNTI (TC-RNTI) into a permanent C-RNTI when determining according to the msg4 that random access succeeds.

The terminal needs to complete a random access process through multiple steps, so that the random access efficiency is relatively low.

SUMMARY

The present disclosure provides a random access method, apparatus and system, and a storage medium, so as to solve the technical problem of relatively low random access efficiency caused by many steps of a random access process.

According to an aspect of embodiments of the present disclosure, a random access method is provided, which may include: receiving, by a terminal, a system message sent by an access network device, the system message including first indication information and second indication information, the first indication information being configured to indicate a first time-frequency resource for sending a preamble in an access message and the second indication information being configured to indicate a second time-frequency resource for sending a load in the access message; sending, by the terminal, the preamble on the first time-frequency resource; and scrambling, by the terminal, the load in the access message according to a Radio Network Temporary Identifier (RNTI) and sending the scrambled load on the second time-frequency resource.

In an optional implementation mode, the terminal may scramble the load in the access message according to the RNTI and at least one of an index of the preamble or a cell Identity (ID).

In an optional implementation mode, in response to determining that the terminal is in an uplink to-be-synchronized state or about to send scheduling signaling of requesting for an uplink, the RNTI may be a C-RNTI, and the operation that the terminal scrambles the load in the access message according to an RNTI may include: the terminal acquires the C-RNTI allocated by the access network device; and the terminal scrambles the load in the access message according to the C-RNTI.

In an optional implementation mode, in response to determining that the terminal is in an initial random access state, the RNTI may be a Random Access-RNTI (RA-RNTI), and the operation that the terminal scrambles the load in the access message according to the RNTI may include: the terminal calculates the RA-RNTI according to the first indication information; and the terminal scrambles the load in the access message according to the RA-RNTI.

In an optional implementation mode, a time-domain resource in the first time-frequency resource and a time-domain resource in the second time-frequency resource may be discontinuous.

In an optional implementation mode, the first time-frequency resource may include multiple time-frequency sub-resources, each time-frequency sub-resource may be configured to send a preamble, and the operation that the terminal sends the preamble on the first time-frequency resource may include: the terminal sends a preamble on each time-frequency sub-resource in the first time-frequency resource.

In an optional implementation mode, the system message may further include a Synchronization Signal Block (SSB); the method may further include: the terminal selects an SSB from SSBs in the system message and acquires Reference Signal Receiving Power (RSRP) of the selected SSB; and the operation that the terminal sends the scrambled load on the second time-frequency resource may include: the terminal determines predetermined sending power according to the RSRP, and sends the scrambled load on the second time-frequency resource according to the predetermined sending power.

In an optional implementation mode, the system message may further include first Modulation and Coding Scheme (MCS) information and second MCS information, and a numerical value of the second MCS information may be greater than or equal to a numerical value of the first MCS information; the operation that the terminal sends the preamble on the first time-frequency resource may include: the terminal sends the preamble on the first time-frequency resource according to the first MCS information; and the operation that the terminal sends the scrambled load on the second time-frequency resource may include: the terminal sends the scrambled load on the second time-frequency resource according to the second MCS information.

In an optional implementation mode, the operation that the terminal receives the system message sent by the access network device may include: the terminal receives, on an omnidirectional beam, the system message sent by the access network device; or, the terminal receives, on a directional beam, the system message sent by the access network device.

In an optional implementation mode, the system message may include a System Information Block 1 (SIB1), and the first indication information and the second indication information may be included in the SIB1.

In an optional implementation mode, the system message may include a SIB1 and a SIBn, the first indication information may be included in the SIB1, and the second indication information may be included in the SIBn.

According to an aspect of the embodiments of the present disclosure, a random access method is provided, which may include: generating, by an access network device, a system message, the system message including first indication information and second indication information, the first indication information being configured to indicate a first time-frequency resource for sending a preamble in an access message and the second indication information being configured to indicate a second time-frequency resource for sending a load in the access message; sending, by the access network device, the system message to a terminal; receiving, by the access network device, the preamble on the first time-frequency resource; and receiving, by the access network device, a scrambled load on the second time-frequency resource and descrambling the scrambled load according to a Radio Network Temporary Identifier (RNTI) to obtain the load in the access message.

In an optional implementation mode, the access network device may descramble the scrambled load according to the RNTI and at least one of an index of the preamble or a cell ID.

In an optional implementation mode, in response to determining that the terminal is in an uplink to-be-synchronized state or about to send scheduling signaling of requesting for an uplink, the RNTI may be a C-RNTI, and the operation that the access network device descrambles the scrambled load according to the RNTI to obtain the load in the access message may include: the access network device acquires the C-RNTI allocated to the terminal; and the access network device descrambles the scrambled load according to the C-RNTI to obtain the load in the access message.

In an optional implementation mode, in response to determining that the terminal is in an initial random access state, the RNTI may be an RA-RNTI, and the operation that the access network device descrambles the scrambled load according to the RNTI to obtain the load in the access message may include: the access network device calculates the RA-RNTI according to the first indication information; and the access network device descrambles the scrambled load according to the RA-RNTI to obtain the load in the access message.

In an optional implementation mode, a time-domain resource in the first time-frequency resource and a time-domain resource in the second time-frequency resource may be discontinuous.

In an optional implementation mode, the first time-frequency resource may include multiple time-frequency sub-resources, each time-frequency sub-resource may be configured to send a preamble, and the operation that the access network device receives the preamble on the first time-frequency resource may include: the access network device receives a preamble on each time-frequency sub-resource in the first time-frequency resource.

In an optional implementation mode, the system message may further include an SSB, and the operation that the access network device receives the scrambled load on the second time-frequency resource may include: the access network device receives, on the second time-frequency resource, the scrambled load sent according to predetermined sending power, the predetermined sending power being determined by the terminal, after selecting an SSB from SSBs in the system message and acquiring RSRP of the selected SSB, according to the RSRP.

In an optional implementation mode, the system message may further include first MCS information and second MCS information, and a numerical value of the second MCS information may be greater than or equal to a numerical value of the first MCS information; the operation that the access network device receives the preamble on the first time-frequency resource may include: the access network device receives the preamble on the first time-frequency resource according to the first MCS information; and the operation that the access network device receives the scrambled load on the second time-frequency resource may include: the access network device receives the scrambled load on the second time-frequency resource according to the second MCS information.

In an optional implementation mode, the operation that the access network device sends the system message to the terminal may include: the access network device sends the system message to the terminal on an omnidirectional beam; or, the access network device sends the system message to the terminal on a directional beam.

In an optional implementation mode, the system message may include a SIB1, and the first indication information and the second indication information may be included in the SIB1.

In an optional implementation mode, the system message may include a SIB1 and a SIBn, the first indication information may be included in the SIB1, and the second indication information may be included in the SIBn.

According to an aspect of the embodiments of the present disclosure, a random access apparatus is provided, which may be applied to a terminal and include: a receiving module, configured to receive a system message sent by an access network device, the system message including first indication information and second indication information, the first indication information being configured to indicate a first time-frequency resource for sending a preamble in an access message and the second indication information being configured to indicate a second time-frequency resource for sending a load in the access message; and a sending module, configured to send the preamble on the first time-frequency resource; wherein the sending module may further be configured to scramble the load in the access message according to an RNTI and send the scrambled load on the second time-frequency resource.

In an optional implementation mode, the sending module may scramble the load in the access message according to the RNTI and at least one of an index of the preamble or a cell ID.

In an optional implementation mode, in response to determining that the terminal is in an uplink to-be-synchronized state or about to send scheduling signaling of requesting for an uplink, the RNTI may be a C-RNTI; and the sending module may further be configured to: acquire the C-RNTI allocated by the access network device; and scramble the load in the access message according to the C-RNTI.

In an optional implementation mode, in response to determining that the terminal is in an initial random access state, the RNTI may be an RA-RNTI; and the sending module may further be configured to: calculate the RA- RNTI according to the first indication information; and scramble the load in the access message according to the RA-RNTI.

In an optional implementation mode, a time-domain resource in the first time-frequency resource and a time-domain resource in the second time-frequency resource may be discontinuous.

In an optional implementation mode, the first time-frequency resource may include multiple time-frequency sub-resources, each time-frequency sub-resource may be configured to send a preamble, and the sending module may further be configured to: send a preamble on each time-frequency sub-resource in the first time-frequency resource.

In an optional implementation mode, the system message may further include an SSB; the apparatus may further include: an acquisition module, configured to select an SSB from SSBs in the system message and acquire RSRP of the selected SSB; and the sending module may further be configured to determine predetermined sending power according to the RSRP and send the scrambled load on the second time-frequency resource according to the predetermined sending power.

In an optional implementation mode, the system message may further include first MCS information and second MCS information, and a numerical value of the second MCS information may be greater than or equal to a numerical value of the first MCS information; and the sending module may further be configured to: send the preamble on the first time-frequency resource according to the first MCS information; and send the scrambled load on the second time-frequency resource according to the second MCS information.

In an optional implementation mode, the receiving module may further be configured to: receive, on an omnidirectional beam, the system message sent by the access network device; or, receive, on a directional beam, the system message sent by the access network device.

In an optional implementation mode, the system message may include a SIB1, and the first indication information and the second indication information may be included in the SIB1.

In an optional implementation mode, the system message may include a SIB1 and a SIBn, the first indication information may be included in the SIB1, and the second indication information may be included in the SIBn.

According to an aspect of the embodiments of the present disclosure, a random access apparatus is provided, which may be applied to an access network device and include: a generation module, configured to generate a system message, the system message including first indication information and second indication information, the first indication information being configured to indicate a first time-frequency resource for sending a preamble in an access message and the second indication information being configured to indicate a second time-frequency resource for sending a load in the access message; a sending module, configured to send the system message generated by the generation module to a terminal; and a receiving module, configured to receive the preamble on the first time-frequency resource; wherein the receiving module may further be configured to receive a scrambled load on the second time-frequency resource and descramble the scrambled load according to an RNTI to obtain the load in the access message.

In an optional implementation mode, the receiving module may descramble the scrambled load according to the RNTI and at least one of an index of the preamble or a cell ID.

In an optional implementation mode, in response to determining that the terminal is in an uplink to-be-synchronized state or about to send scheduling signaling of requesting for an uplink, the RNTI may be a C-RNTI; and the receiving module may further be configured to: acquire the C-RNTI allocated to the terminal; and descramble the scrambled load according to the C-RNTI to obtain the load in the access message.

In an optional implementation mode, in response to determining that the terminal is in an initial random access state, the RNTI may be an RA-RNTI; and the receiving module may further be configured to: calculate the RA-RNTI according to the first indication information; and descramble the scrambled load according to the RA-RNTI to obtain the load in the access message.

In an optional implementation mode, a time-domain resource in the first time-frequency resource and a time-domain resource in the second time-frequency resource may be discontinuous.

In an optional implementation mode, the first time-frequency resource may include multiple time-frequency sub-resources, each time-frequency sub-resource may be configured to send a preamble, and the receiving module may further be configured to: receive a preamble on each time-frequency sub-resource in the first time-frequency resource.

In an optional implementation mode, the system message may further include an SSB; and the receiving module may further be configured to: receive, on the second time-frequency resource, the scrambled load sent according to predetermined sending power, the predetermined sending power being determined by the terminal, after selecting an SSB from SSBs in the system message and acquiring RSRP of the selected SSB, according to the RSRP.

In an optional implementation mode, the system message may further include first MCS information and second MCS information, and a numerical value of the second MCS information may be greater than or equal to a numerical value of the first MCS information; and the receiving module may further be configured to: receive the preamble on the first time-frequency resource according to the first MCS information; and receive the scrambled load on the second time-frequency resource according to the second MCS information.

In an optional implementation mode, the sending module may further be configured to: send the system message to the terminal on an omnidirectional beam; or, send the system message to the terminal on a directional beam.

In an optional implementation mode, the system message may include a SIB1, and the first indication information and the second indication information may be included in the SIB1.

In an optional implementation mode, the system message may include a SIB1 and a SIBn, the first indication information may be included in the SIB1, and the second indication information may be included in the SIBn.

According to an aspect of the embodiments of the present disclosure, a terminal is provided, which may include: a processor; and a memory configured to store instructions executable by the processor; where the processor may be configured to: receive a system message sent by an access network device, the system message including first indication information and second indication information, the first indication information being configured to indicate a first time-frequency resource for sending a preamble in an access message and the second indication information being configured to indicate a second time-frequency resource for sending a load in the access message; send the preamble on the first time-frequency resource; and scramble the load in the access message according to an RNTI and send the scrambled load on the second time-frequency resource.

According to an aspect of the embodiments of the present disclosure, an access network device is provided, which may include: a processor; and a memory configured to store instructions executable by the processor; where the processor may be configured to: generate a system message, the system message including first indication information and second indication information, the first indication information being configured to indicate a first time-frequency resource for sending a preamble in an access message and the second indication information being configured to indicate a second time-frequency resource for sending a load in the access message; send the system message to a terminal; receive the preamble on the first time-frequency resource; and receive a scrambled load on the second time-frequency resource and descramble the scrambled load according to an RNTI to obtain the load in the access message.

According to a seventh aspect of the embodiments of the present disclosure, a random access system is provided, which may include the above-mentioned random access apparatus and the above-mentioned random access apparatus; or, include the above-mentioned terminal and the above-mentioned access network device.

According to an eighth aspect of the embodiments of the present disclosure, a computer-readable storage medium is provided, in which at least one instruction, at least one segment of program, a code set or an instruction set may be stored, where the at least one instruction, the at least one segment of program, the code set or the instruction set may be loaded and executed by a processor to implement the above-mentioned random access method; or, the at least one instruction, the at least one segment of program, the code set or the instruction set may be loaded and executed by the processor to implement the above-mentioned random access method.

The technical solutions provided in the embodiments of the present disclosure may have the following beneficial effects.

Since the system message includes the first indication information and the second indication information, the terminal may send the preamble in the access message on the first time-frequency resource indicated by the first indication information, scramble the load in the access message according to the RNTI and send the scrambled load on the second time-frequency resource indicated by the second indication information. Therefore, the terminal may be instructed by using the system message to send the preamble and the scrambled load. Compared with instructing the terminal by using the system message to send the preamble and instructing the terminal by using an msg2 to send an msg3, this manner has the advantages that steps of a random access process may be reduced, thereby improving the random access efficiency.

BRIEF DESCRIPTION OF THE DRAWINGS

The accompanying drawings, which are incorporated in and constitute a part of this specification of the present disclosure, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Figure 1:
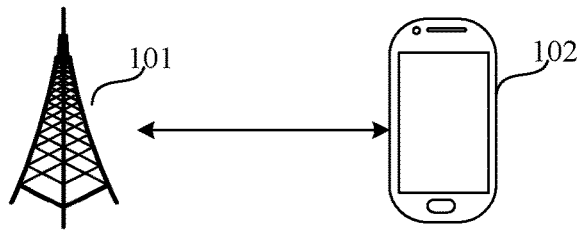
FIG. 1 is a schematic diagram illustrating an implementation environment involved in each embodiment of the present disclosure.

FIG. 1 is a structure diagram of a mobile communication system, according to an embodiment of the present disclosure. The mobile communication system may be a 5th-Generation (5G) system, also called a New Radio (NR) system. The mobile communication system includes an access network device 101 and a terminal 102.

The access network device 101 may be a base station. A specific implementation mode of the access network device 101 is not limited in the embodiment of the present application. Optionally, the access network device 101 may also include a Home Evolved Node B (HeNB), a relay, a Pico and other base station.

The access network device 101 establishes a wireless connection with the terminal 102 by wireless air interface. Optionally, the wireless air interface is a 5G-standard-based wireless air interface. For example, the wireless air interface is an NR interface. Alternatively, the wireless air interface may be a wireless air interface based on a next-generation mobile communication network technology standard after 5G standard.

The terminal 102 may refer to a device providing voice and/or data connectivity for a user. The terminal 102 may communicate with one or more core networks through a Radio Access Network (RAN). The terminal 102 may be a mobile terminal, e.g., a mobile phone (or called a "cell" phone) or a computer with a mobile terminal, and for example, may be a portable, pocket-sized, handheld, computer-embedded or vehicle-mounted mobile device, such as a subscriber unit, a subscriber station, a mobile station, a mobile, a remote station, an access point, a remote terminal, an access terminal, a user terminal, a user agent, a user device or User Equipment (UE).

It is to be noted that the mobile communication system shown in FIG. 1 may include multiple access network devices 101 and/or multiple terminals 102. FIG. 1 shows one access network device 101 and one terminal 102 for exemplary description. However, no limits are made thereto in the present embodiment.

Figure 2:
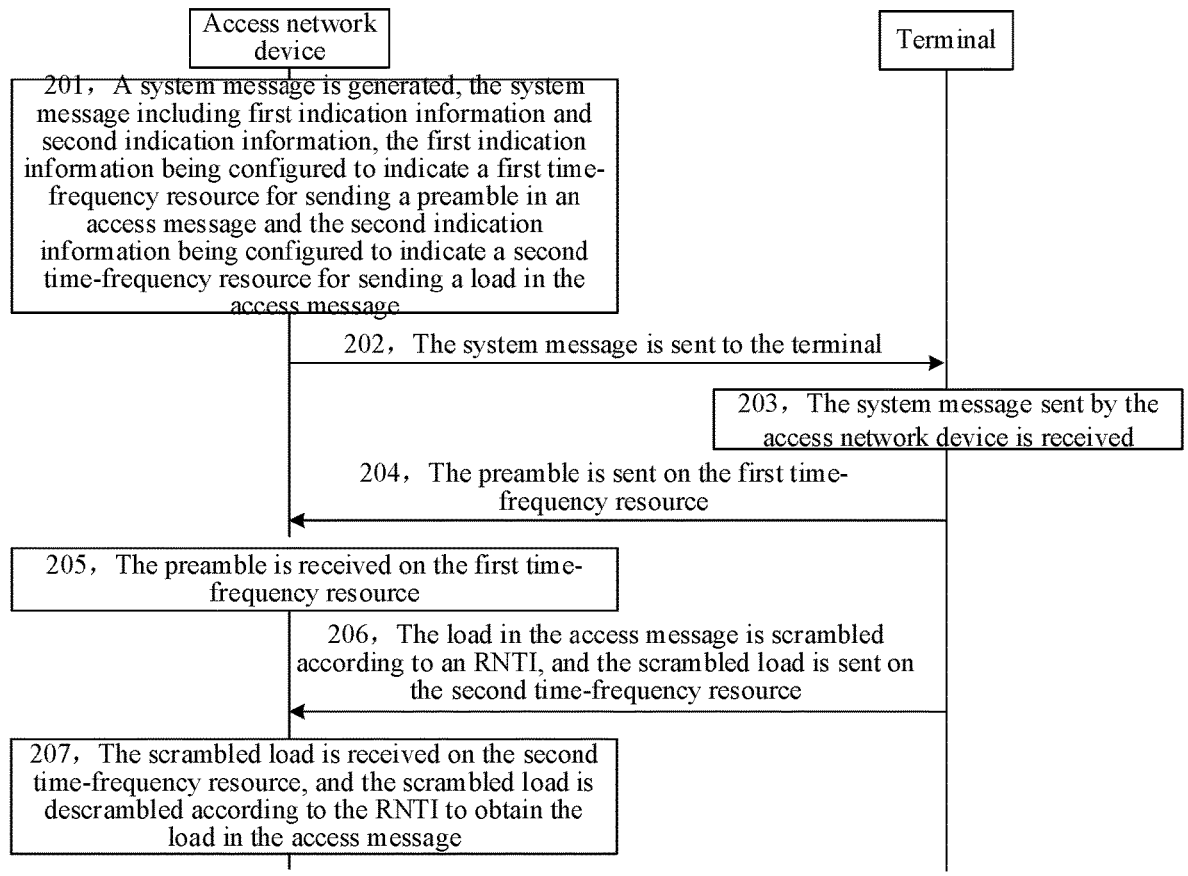
FIG. 2 is a flow chart showing a random access method, according to an exemplary embodiment.

FIG. 2 is a flow chart showing a random access method, according to an exemplary embodiment. The random access method is applied to the implementation environment shown in FIG. 1. As shown in FIG. 2, the random access method includes the following steps.

In Step 201, an access network device generates a system message, the system message including first indication information and second indication information, the first indication information being configured to indicate a first time-frequency resource for sending a preamble in an access message and the second indication information being configured to indicate a second time-frequency resource for sending a load in the access message.

In Step 202, the access network device sends the system message to a terminal.

In Step 203, the terminal receives the system message sent by the access network device.

In Step 204, the terminal sends the preamble on the first time-frequency resource.

In Step 205, the access network device receives the preamble on the first time-frequency resource.

In Step 206, the terminal scrambles the load in the access message according to an RNTI and sends the scrambled load on the second time-frequency resource.

In Step 207, the access network device receives the scrambled load on the second time-frequency resource and descrambles the scrambled load according to the RNTI to obtain the load in the access message.

Steps 201 to 202, 205 and 207 may be implemented independently to form an embodiment for an access network device side, and Steps 203 to 204 and 206 may be implemented independently to form an embodiment for a terminal side.

In summary, according to the random access method provided in the present disclosure, since the system message includes the first indication information and the second indication information, the terminal may send the preamble in the access message on the first time-frequency resource indicated by the first indication information, scramble the load in the access message according to the RNTI, and send the scrambled load on the second time-frequency resource indicated by the second indication information. Therefore, the terminal may be instructed by using the system message to send the preamble and the scrambled load. Compared with instructing the terminal by using the system message to send the preamble and instructing the terminal by using an msg2 to send an msg3, this manner has the advantages that steps of a random access process may be reduced, thereby improving the random access efficiency.

Figure 3:
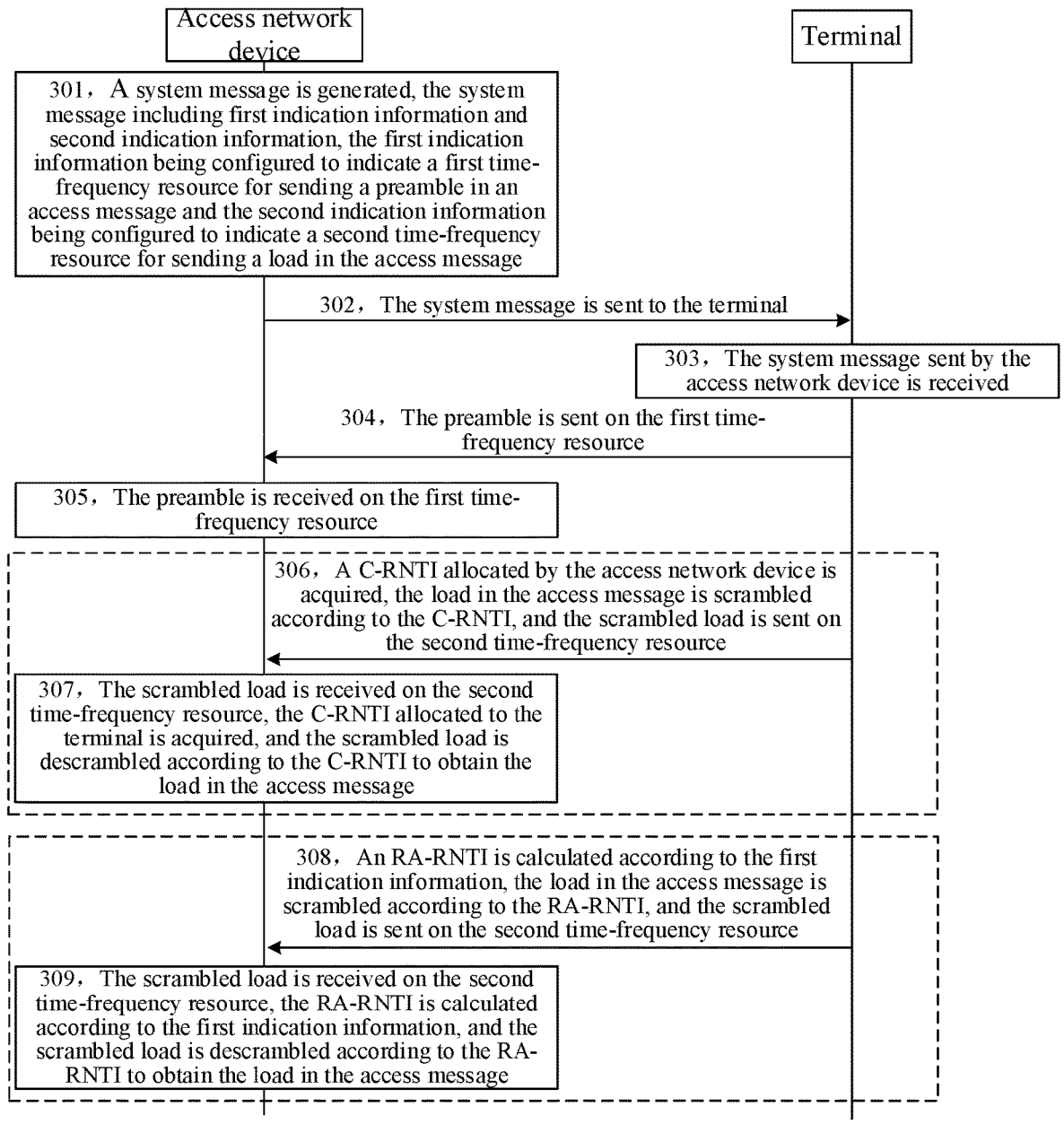
FIG. 3 is a flow chart showing a random access method, according to an exemplary embodiment.

FIG. 3 is a flow chart showing a random access method, according to another exemplary embodiment. The random access method is applied to the implementation environment shown in FIG. 1. As shown in FIG. 3, the random access method includes the following steps.

In Step 301, an access network device generates a system message, the system message including first indication information and second indication information, the first indication information being configured to indicate a first time-frequency resource for sending a preamble in an access message and the second indication information being configured to indicate a second time-frequency resource for sending a load in the access message.

The system message is a message used by the access network device and a terminal in a random access process. A content in the system message will be introduced below.

In an optional implementation mode, the system message may include an SSB. The SSB includes a Primary Synchronization Signal (PSS) and a Secondary Synchronization Signal (SSS). The PSS and the SSS are configured to enable the terminal to perform downlink synchronization with the access network device.

In an optional implementation mode, the system message may include k SIBs, k being a positive integer. Both the first indication information and the second indication information may be included in a SIB1. Alternatively, the first indication information may be included in the SIB1, a new SIBn may further be defined, and the second indication information may be included in the SIBn. The first indication information is configured to indicate, to the terminal, the first time-frequency resource for sending the preamble in the access message. The second indication information is configured to indicate, to the terminal, the second time-frequency resource for sending the load in the access message.

The access message is used to enable the terminal to randomly access a network. The access message may include the preamble and the load. Of course, the access message may further include other information, or may include no other information. No limits are made in the present embodiment.

The preamble is configured to identify an identity of the terminal during random access. If the terminal does not store the preamble of the access network device, the preamble may further be included by the access network device in the system message to be sent to the terminal, and the system message further includes the preamble. The system message may not include the preamble if the terminal stores the preamble of the access network device. When the terminal accesses the access network device through a contention mechanism, the system message includes a preamble sequence, and each preamble is used for access based on the contention mechanism.

The load is configured to send information about Radio Resource Control (RRC). The load may include different contents in different application scenes. For example, when the terminal is in an uplink to-be-synchronized state or about to send scheduling signaling of requesting for an uplink, the load may include an RRC connection resume request (RRC Connection Resume/re-establishment), which may include an establishment cause (establishmentcause): the terminal is in the uplink to-be-synchronized state (also called an uplink out-of-sync state and needs to re-access the network, or, an upper layer needs to transmit data of a certain size but a network side does not configure an uplink transmission resource and a C-RNTI allocated by the network side to the terminal may be included. For another example, when the terminal is in an initial random access state, the load may include an RRC connection request, which may include an initial UE ID and an establishment cause: emergency, high-PriorityAccess, mt-Access, mo-Signaling, mo-Data, mo-VoiceCall, mo-VideoCall, mo-SMS, mps-PriorityAccess, and mcs-PriorityAccess.

The access network device may determine the first time-frequency resource and the second time-frequency resource according to a predetermined algorithm. A frequency-domain resource in the first time-frequency resource may be the same as or different from that in the second time-frequency resource. No limits are made in the present embodiment. A time-domain resource in the first time-frequency resource is different from that in the second time-frequency resource. In an optional implementation mode, the time-domain resource in the first time-frequency resource and the time-domain resource in the second time-frequency resource are discontinuous. That is, the preamble and load in the access message are sent separately. The time-domain resource in the second time-frequency resource is after that in the first time-frequency resource. That is, the terminal sends the preamble in the access message at first and then sends the load in the access message.

It is to be noted that the time-domain resource in the first time-frequency resource and the time-domain resource in the second time-frequency resource are in the same sending period and the two time-domain resources are spaced by a predetermined number of time cells. The time cell may be a millisecond (ms), a symbol, a slot, etc. No limits are made in the present embodiment.

In an optional implementation mode, the system message may include first MCS information and second MCS information. The first MCS information is configured to indicate a transmission rate of the preamble. The second MCS information is configured to indicate a transmission rate of the load. Optionally, the first MCS information and the second MCS information may be indexes configured to indicate a set of transmission parameters in a rate table.

In the present embodiment, a numerical value of the first MCS information may be the same as that of the second MCS information, and then the transmission rates of the preamble and the load are the same. Alternatively, the numerical value of the first MCS information may be different from that of the second MCS information, and then the transmission rates of the preamble and the load are different.

Normally, the transmission rate of the load may be greater than or equal to that of the preamble. In the rate table, the index is positively related to the transmission rate. Therefore, if the transmission rate of the load is required to be higher than that of the preamble, the access network device may set the numerical value of the second MCS information to be greater than that of the first MCS information.

In Step 302, the access network device sends the system message to a terminal.

In an optional implementation mode, the access network device may send the system message to the terminal on an omnidirectional beam. Alternatively, the access network device may send the system message to the terminal on a directional beam.

In Step 303, the terminal receives the system message sent by the access network device.

The terminal receives, on the omnidirectional beam, the system message sent by the access network device when the access network device sends the system message to the terminal on the omnidirectional beam. The terminal receives, on the directional beam, the system message sent by the access network device when the access network device sends the system message to the terminal on the directional beam.

In Step 304, the terminal sends the preamble on the first time-frequency resource.

When the first indication information is included in the SIB1, the terminal may read the first indication information from the SIB1, then determine the first time-frequency resource according to the first indication information, determine the preamble to be sent, and send the preamble on the first time-frequency resource.

In an optional implementation mode, the terminal may determine a preamble to be sent and send the preamble on the first time-frequency resource. Multiple terminals may simultaneously send preambles to the access network device, and the preamble sent by the terminal may not be received by the access network device. Therefore, the terminal may optionally further send multiple preambles to the access network device to increase the probability that the preamble sent by the terminal is received by the access network device, thereby increasing the success rate of random access. In this implementation mode, the first time-frequency resource may include multiple time-frequency sub-resources, and each time-frequency sub-resource is configured to send a preamble. Therefore, multiple preambles may be acquired, and one preamble may be sent on each time-frequency sub-resource in the first time-frequency resource.

In an optional implementation mode, the system message further includes first MCS information, so that the terminal may send the preamble on the first time-frequency resource according to the first MCS information. That is, the terminal may search the rate table for a corresponding set of transmission parameters according to the first MCS information and then send the preamble on the first time-frequency resource according to the transmission parameters.

In Step 305, the access network device receives the preamble on the first time-frequency resource.

When the terminal sends one preamble, the access network device receives the preamble on the first time-frequency resource. When the terminal sends multiple preambles, the access network device receives a preamble on each time-frequency sub-resource in/of the first time-frequency resource.

In an optional implementation mode, the terminal sends the preamble on the first time-frequency resource according to the first MCS information, so that the access network device may receive the preamble on the first time-frequency resource according to the first MCS information. That is, the access network device may search the rate table for a corresponding set of transmission parameters according to the first MCS information and then receive the preamble on the first time-frequency resource according to the transmission parameters.

After sending the preamble, the terminal may acquire an RNTI, scramble the load in the access message according to the RNTI, and send the scrambled load on the second time-frequency resource. Optionally, the terminal may further acquire an index of the preamble, scramble the load in the access message according to the RNTI and the index of the preamble, and send the scrambled load on the second time-frequency resource. Optionally, the terminal may further acquire a cell ID, scramble the load in the access message according to the RNTI and the cell ID, and send the scrambled load on the second time-frequency resource. Optionally, the terminal may further acquire the index of the preamble and the cell ID, scramble the load in the access message according to the RNTI, the index of the preamble and the cell ID, and send the scrambled load on the second time-frequency resource.

The RNTI is related to a present state of the terminal. When the terminal is in an uplink to-be-synchronized state or about to send scheduling signaling of requesting for an uplink, the RNCI is a Cell-Radio Network Temporary Identifier (C-RNTI), the terminal executes Step 306, and the access network device executes Step 307 to complete random access. When the terminal is in an initial random access state, the RNTI is a Random Access-Radio Network Temporary Identifier (RA-RNTI), the terminal executes Step 308, and the access network device executes Step 309 to complete random access.

In Step 306, the terminal acquires a C-RNTI allocated by the access network device, scrambles the load in the access message according to the C-RNTI, and sends the scrambled load on the second time-frequency resource.

The C-RNTI allocated by the access network device before is stored in the terminal when the terminal is in an uplink to-be-synchronized state or about to send scheduling signaling of requesting for an uplink. Therefore, the terminal may read the C-RNTI, then scramble the load in the access message according to the C-RNTI to obtain the scrambled load, and then send the scrambled load on the second time-frequency resource.

Optionally, the terminal may also scramble the load according to the C-RNTI and the index of the preamble. Alternatively, the terminal may scramble the load according to the C-RNTI and the cell ID. Alternatively, the terminal may scramble the load according to the C-RNTI, the index of the preamble and the cell ID.

The access network device further needs to determine sending power before sending the scrambled load. The access network device may determine the sending power based on RSRP of an SSB.

Since the access network device may send multiple SSBs to the terminal, the method further includes: the terminal selects an SSB from SSBs in the system message and acquires RSRP of the selected SSB. Then, the terminal determines predetermined sending power according to the RSRP and sends the scrambled load on the second time-frequency resource according to the predetermined sending power. Normally, the predetermined sending power may be greater than or equal to the RSRP such that it may be ensured that the access network device may receive the scrambled load.

In an optional implementation mode, the system message further includes second MCS information, so that the terminal may send the scrambled load on the second time-frequency resource according to the second MCS information. That is, the terminal may search the rate table for a corresponding set of transmission parameters according to the second MCS information, and then send the scrambled load on the second time-frequency resource according to the transmission parameters.

In Step 307, the access network device receives the scrambled load on the second time-frequency resource, acquires the C-RNTI allocated to the terminal, and descrambles the scrambled load according to the C-RNTI to obtain the load in the access message.

In an optional implementation mode, the terminal sends the scrambled load on the second time-frequency resource according to the predetermined sending power, and the access network device receives, on the second time-frequency resource, the scrambled load sent according to the predetermined sending power. A determination flow of the predetermined sending power refers to the descriptions in Step 306, and will not be repeated herein.

In an optional implementation mode, the terminal sends the scrambled load on the second time-frequency resource according to the second MCS information, so that the access network device may receive the scrambled load on the second time-frequency resource according to the second MCS information. That is, the access network device may search the rate table for a corresponding set of transmission parameters according to the second MCS information, and then receive the scrambled load on the second time-frequency resource according to the transmission parameters.

The C-RNTI allocated to the terminal before is stored in the access network device when the terminal is in an uplink to-be-synchronized state or about to send scheduling signaling of requesting for an uplink. Therefore, the access network device may read the C-RNTI, then descramble the scrambled load according to the C-RNTI to obtain the load in the access message and then complete random access according to the load.

Optionally, the access network device descrambles the scrambled load according to the C-RNTI and the index of the preamble when the terminal scrambles the load according to the C-RNTI and the index of the preamble. The access network device descrambles the scrambled load according to the C-RNTI and the cell ID when the terminal scrambles the load according to the C-RNTI and the cell ID. The access network device descrambles the scrambled load according to the C-RNTI, the index of the preamble and the cell ID when the terminal scrambles the load according to the C-RNTI, the index of the preamble and the cell ID.

In Step 308, the terminal calculates an RA-RNTI according to the first indication information, scrambles the load in the access message according to the RA-RNTI, and sends the scrambled load on the second time-frequency resource.

The C-RNTI is not stored in the terminal when the terminal is in an initial random access state. Therefore, the terminal needs to calculate the RA-RNTI, scramble the load in the access message according to the RA-RNTI to obtain the scrambled load, and then send the scrambled load on the second time-frequency resource.

Optionally, the terminal may also scramble the load according to the RA-RNTI and the index of the preamble. Alternatively, the terminal may scramble the load according to the RA-RNTI and the cell ID. Alternatively, the terminal may scramble the load according to the RA-RNTI, the index of the preamble and the cell ID.

In an optional implementation mode, the terminal may determine the first time-frequency resource according to the first indication information, and then calculate the RA-RNTI according to the first time-frequency resource. A calculation manner is not limited in the present embodiment.

After obtaining the scrambled load, the terminal may send the scrambled load in the sending manner in Step 306. For example, the terminal sends the scrambled load on the second time-frequency resource according to the predetermined sending power. Alternatively, the terminal sends the scrambled load on the second time-frequency resource according to the second MCS information. Implementation details refer to the descriptions in Step 306, and elaborations are omitted herein.

In Step 309, the access network device receives the scrambled load on the second time-frequency resource, calculates the RA-RNTI according to the first indication information, and descrambles the scrambled load according to the RA-RNTI to obtain the load in the access message.

The access network device may receive the scrambled load in the receiving manner in Step 307. For example, the access network device receives, on the second time-frequency resource, the scrambled load sent according to the predetermined sending power. Alternatively, the access network device receives the scrambled load on the second time-frequency resource according to the second MCS information. Implementation details refer to the descriptions in Step 307, and elaborations are omitted herein.

The C-RNTI allocated to the terminal is not stored in the access network device when the terminal is in an initial random access state. Therefore, the access network device needs to calculate the RA-RNTI, then descramble the scrambled load according to the RA-RNTI to obtain the load in the access message, and then complete random access according to the load.

Optionally, the access network device descrambles the scrambled load according to the RA-RNTI and the index of the preamble when the terminal scrambles the load according to the RA-RNTI and the index of the preamble. The access network device descrambles the scrambled load according to the RA-RNTI and the cell ID when the terminal scrambles the load according to the RA-RNTI and the cell ID. The access network device descrambles the scrambled load according to the RA-RNTI, the index of the preamble and the cell ID when the terminal scrambles the load according to the RA-RNTI, the index of the preamble and the cell ID.

Steps 301 to 302, 305 and 307 may be implemented independently to form an embodiment for an access network device side, and Steps 303 to 304 and 306 may be implemented independently to form an embodiment for a terminal side. Alternatively, Steps 301 to 302, 305 and 309 may be implemented independently to form an embodiment for an access network device side, and Steps 303 to 304 and 308 may be implemented independently to form an embodiment for a terminal side.

In summary, according to the random access method provided in the present disclosure, since the system message includes the first indication information and the second indication information, the terminal may send the preamble in the access message on the first time-frequency resource indicated by the first indication information, scramble the load in the access message according to the RNTI, and send the scrambled load on the second time-frequency resource indicated by the second indication information. Therefore, the terminal may be instructed by using the system message to send the preamble and the scrambled load. Compared with instructing the terminal by using the system message to send the preamble and instructing the terminal by using an msg2 to send an msg3, this manner has the advantages that steps of a random access process may be reduced, thereby improving the random access efficiency.

Multiple preambles are sent to the access network device to increase the probability that the preamble sent by the terminal is received by the access network device, thereby increasing the success rate of random access.

In the embodiment of the present disclosure, a new frame format may be set for the access message. Referring to the following Table 1, the frame format of the access message may be a format indicated by one of indexes 33 to 51.

TABLE 1

| Index | LCID values |
|---|---|
| 0 | CCCH of size 64 bits (referred to as "CCCH1" in TS 38.331 [5]) |
| 1-32 | Identity of the logical channel |
| 33-51 | Reserved |
| 52 | CCCH of size 48 bits (referred to as "CCCH" in TS 38.331 [5]) |
| 53 | Recommended bit rate query |
| 54 | Multiple Entry PHR (four octet Ci) |
| 55 | Configured Grant Confirmation |
| 56 | Multiple Entry PHR (one octet Ci) |
| 57 | Single Entry PHR |
| 58 | C-RNTI |
| 59 | Short Truncated BSR |
| 60 | Long Truncated BSR |

TABLE 1-continued

| Index | LCID values |
|---|---|
| 61 | Short BSR |
| 62 | Long BSR |
| 63 | Padding |

Figure 4:
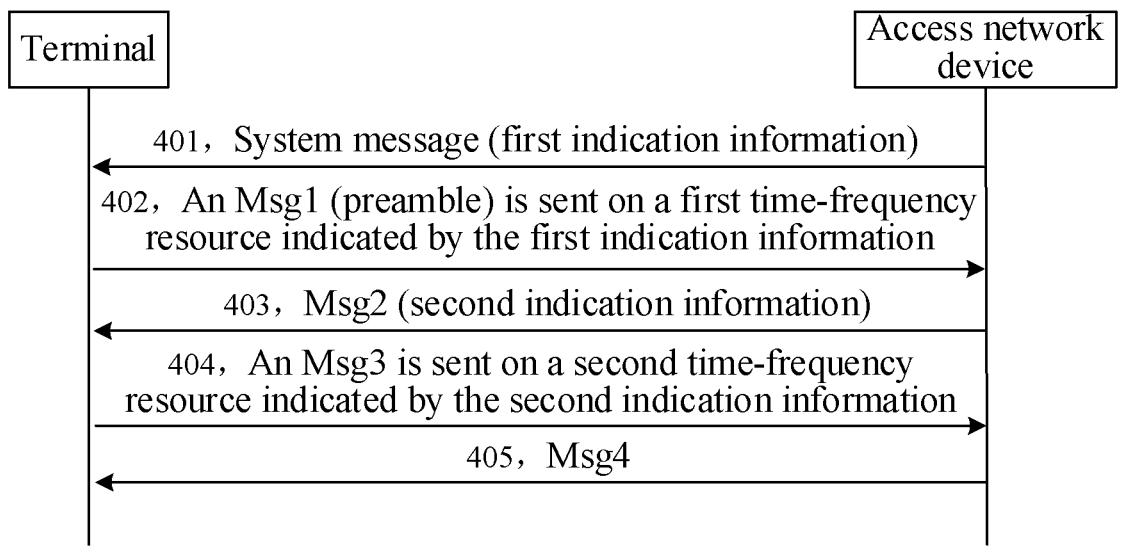
FIG. 4 is a flow chart showing a random access method, according to the related art.
Figure 5:
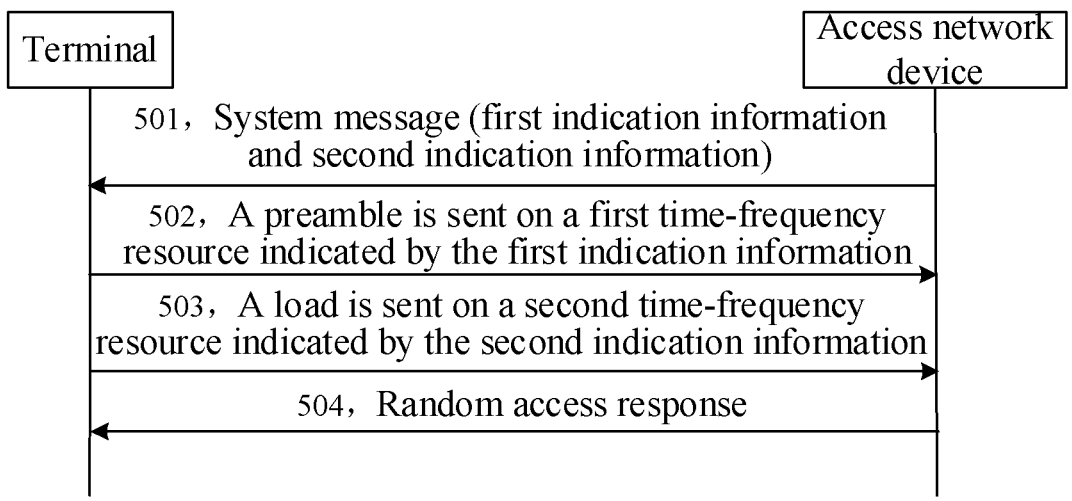
FIG. 5 is a flow chart showing a random access method, according to an exemplary embodiment.

Random access flows of the related art and the present embodiment will be described below. FIG. 4 shows the random access flow in the related art. FIG. 5 shows the random access flow of the present embodiment.

The random access flow in the related art is as follows.
In Step 401, an access network device sends a system message (first indication information) to a terminal.
In Step 402, the terminal sends an msg1 (preamble) to the access network device on a first time-frequency resource indicated by the first indication information.
In Step 403, the access network device sends an msg2 (second indication information) to the terminal.
In Step 404, the terminal sends an msg3 to the access network device on a second time-frequency resource indicated by the second indication information.
In Step 405, the access network device sends an msg4 to the terminal.

The random access flow of the present embodiment is as follows.
In Step 501, an access network device sends a system message (first indication information and second indication information) to a terminal.
In Step 502, the terminal sends a preamble to the access network device on a first time-frequency resource indicated by the first indication information.
In Step 503, the terminal sends a load to the access network device on a second time-frequency resource indicated by the second indication information.
In Step 504, the access network device sends a random access response to the terminal.

It is to be noted that the access network device may further scramble the random access response, and a scrambling manner is the same as that used by the terminal for the load. For example, when the terminal scrambles the load in the access message according to a C-RNTI, the access network device scrambles the random access response according to the C-RNTI and sends the scrambled random access response to the terminal, and the terminal performs descrambling according to the C-RNTI to obtain the random access response. Alternatively, when the terminal scrambles the load in the access message according to a C-RNTI and an index of the preamble, the access network device scrambles the random access response according to the C-RNTI and the index of the preamble and sends the scrambled random access response to the terminal, and the terminal performs descrambling according to the C-RNTI and the index of the preamble to obtain the random access response. Alternatively, when the terminal scrambles the load in the access message according to a C-RNTI and a cell ID, the access network device scrambles the random access response according to the C-RNTI and the cell ID and sends the scrambled random access response to the terminal, and the terminal performs descrambling according to the C-RNTI and the cell ID to obtain the random access response. Alternatively, when the terminal scrambles the load in the access message according to a C-RNTI, an index of the preamble and a cell ID, the access network device scrambles the random access response according to the C-RNTI, the index of the preamble and the cell ID and sends the scrambled random access response to the terminal, and the terminal performs descrambling according to the C-RNTI, the index of the preamble and the cell ID to obtain the random access response.

For another example, when the terminal scrambles the load in the access message according to an RA-RNTI, the access network device scrambles the random access response according to the RA-RNTI and sends the scrambled random access response to the terminal, and the terminal performs descrambling according to the RA-RNTI to obtain the random access response. Alternatively, when the terminal scrambles the load in the access message according to an RA-RNTI and an index of the preamble, the access network device scrambles the random access response according to the RA-RNTI and the index of the preamble and sends the scrambled random access response to the terminal, and the terminal performs descrambling according to the RA-RNTI and the index of the preamble to obtain the random access response. Alternatively, when the terminal scrambles the load in the access message according to an RA-RNTI and a cell ID, the access network device scrambles the random access response according to the RA-RNTI and the cell ID and sends the scrambled random access response to the terminal, and the terminal performs descrambling according to the RA-RNTI and the cell ID to obtain the random access response. Alternatively, when the terminal scrambles the load in the access message according to an RA-RNTI, an index of the preamble and a cell ID, the access network device scrambles the random access response according to the RA-RNTI, the index of the preamble and the cell ID and sends the scrambled random access response to the terminal, and the terminal performs descrambling according to the RA-RNTI, the index of the preamble and the cell ID to obtain the random access response.

It can be seen from the above flows that, according to the present embodiment, the steps of the random access flow may be reduced, thereby improving the random access efficiency.

Figure 6:
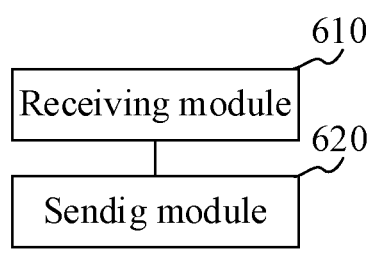
FIG. 6 is a block diagram of a random access apparatus, according to an exemplary embodiment.

FIG. 6 is a block diagram of a random access apparatus, according to an exemplary embodiment. The random access apparatus is applied to the terminal 102 shown in FIG. 1. As shown in FIG. 6, the random access apparatus includes a receiving module 610 and a sending module 620.

The receiving module 610 is configured to receive a system message sent by an access network device, the system message including first indication information and second indication information, the first indication information being configured to indicate a first time-frequency resource for sending a preamble in an access message and the second indication information being configured to indicate a second time-frequency resource for sending a load in the access message.

The sending module 620 is configured to send the preamble on the first time-frequency resource.

The sending module 620 is further configured to scramble the load in the access message according to an RNTI and send the scrambled load on the second time-frequency resource.

In an optional implementation mode, the sending module 620 may scramble the load in the access message according to the RNTI and at least one of an index of the preamble or a cell ID.

In an optional implementation mode, when the terminal is in an uplink to-be-synchronized state or about to send scheduling signaling of requesting for an uplink, the RNTI is a C-RNTI; and the sending module 620 is further configured to: acquire the C-RNTI allocated by the access network device; and scramble the load in the access message according to the C-RNTI.

In an optional implementation mode, when the terminal is in an initial random access state, the RNTI is an RA-RNTI, and the sending module 620 is further configured to: calculate the RA-RNTI according to the first indication information; and scramble the load in the access message according to the RA-RNTI.

In an optional implementation mode, a time-domain resource in the first time-frequency resource and a time-domain resource in the second time-frequency resource are discontinuous.

In an optional implementation mode, the first time-frequency resource includes multiple time-frequency sub-resources, each time-frequency sub-resource is configured to send a preamble; and the sending module 620 is further configured to send a preamble on each time-frequency sub-resource in the first time-frequency resource.

In an optional implementation mode, the system message further includes an SSB. The apparatus further includes an acquisition module. The acquisition module is configured to select an SSB from SSBs in the system message and acquire RSRP of the selected SSB. The sending module 620 is further configured to determine predetermined sending power according to the RSRP and send the scrambled load on the second time-frequency resource according to the predetermined sending power.

In an optional implementation mode, the system message further includes first MCS information and second MCS information, and a numerical value of the second MCS information is greater than or equal to that of the first MCS information. The sending module 620 is further configured to: send the preamble on the first time-frequency resource according to the first MCS information; and send the scrambled load on the second time-frequency resource according to the second MCS information.

In an optional implementation mode, the receiving module 610 is further configured to: receive, on an omnidirectional beam, the system message sent by the access network device; or, receive, on a directional beam, the system message sent by the access network device.

In an optional implementation mode, the system message includes a SIB1, and the first indication information and the second indication information are included in the SIB1.

In an optional implementation mode, the system message includes a SIB1 and a SIBn, the first indication information is included in the SIB1, and the second indication information is included in the SIBn.

In summary, according to the random access apparatus provided in the present disclosure, since the system message includes the first indication information and the second indication information, the terminal may send the preamble in the access message on the first time-frequency resource indicated by the first indication information, scramble the load in the access message according to the RNTI and send the scrambled load on the second time-frequency resource indicated by the second indication information. Therefore, the terminal may be instructed by using the system message to send the preamble and the scrambled load. Compared with instructing the terminal by using the system message to send the preamble and instructing the terminal by using an msg2 to send an msg3, this manner has the advantages that steps of a random access process may be reduced, thereby improving the random access efficiency.

Multiple preambles are sent to the access network device to increase the probability that the preamble sent by the terminal is received by the access network device, thereby increasing the success rate of random access.

Figure 7:
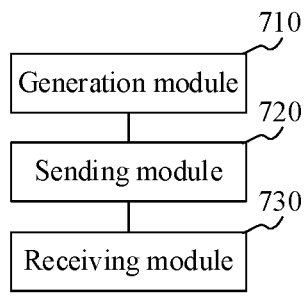
FIG. 7 is a block diagram of a random access apparatus, according to an exemplary embodiment.

FIG. 7 is a block diagram of a random access apparatus, according to an exemplary embodiment. The random access apparatus is applied to the access network device 101 shown in FIG. 1. As shown in FIG. 7, the random access apparatus includes a generation module 710, a sending module 720 and a receiving module 730.

The generation module 710 is configured to generate a system message, the system message including first indication information and second indication information, the first indication information being configured to indicate a first time-frequency resource for sending a preamble in an access message and the second indication information being configured to indicate a second time-frequency resource for sending a load in the access message.

The sending module 720 is configured to send the system message generated by the generation module to a terminal.

The receiving module 730 is configured to receive the preamble on the first time-frequency resource.

The receiving module 730 is further configured to receive a scrambled load on the second time-frequency resource and descramble the scrambled load according to an RNTI to obtain the load in the access message.

In an optional implementation mode, the receiving module 730 may descramble the scrambled load according to the RNTI and at least one of an index of the preamble or a cell ID.

In an optional implementation mode, when the terminal is in an uplink to-be-synchronized state or about to send scheduling signaling of requesting for an uplink, the RNTI is a C-RNTI; and the receiving module 730 is further configured to: acquire the C-RNTI allocated to the terminal; and descramble the scrambled load according to the C-RNTI to obtain the load in the access message.

In an optional implementation mode, when the terminal is in an initial random access state, the RNTI is an RA-RNTI, and the receiving module 730 is further configured to: calculate the RA-RNTI according to the first indication information; and descramble the scrambled load according to the RA-RNTI to obtain the load in the access message.

In an optional implementation mode, a time-domain resource in the first time-frequency resource and a time-domain resource in the second time-frequency resource are discontinuous.

In an optional implementation mode, the first time-frequency resource includes multiple time-frequency sub-resources, each time-frequency sub-resource is configured to send a preamble, and the receiving module 730 is further configured to receive a preamble on each time-frequency sub-resource in the first time-frequency resource.

In an optional implementation mode, the system message further includes an SSB. The receiving module 730 is further configured to: receive, on the second time-frequency resource, the scrambled load sent according to predetermined sending power, the predetermined sending power being determined by the terminal after selecting an SSB from SSBs in the system message and acquiring RSRP of the selected SSB and according to the RSRP.

In an optional implementation mode, the system message further includes first MCS information and second MCS information, and a numerical value of the second MCS information is greater than or equal to that of the first MCS information. The receiving module 730 is further configured to: receive the preamble on the first time-frequency resource according to the first MCS information; and receive the scrambled load on the second time-frequency resource according to the second MCS information.

In an optional implementation mode, the sending module 720 is further configured to: send the system message to the terminal on an omnidirectional beam; or, send the system message to the terminal on a directional beam.

In an optional implementation mode, the system message includes a SIB1, and the first indication information and the second indication information are included in the SIB1.

In an optional implementation mode, the system message includes a SIB1 and a SIBn, the first indication information is included in the SIB1, and the second indication information is included in the SIBn.

In summary, according to the random access apparatus provided in the present disclosure, since the system message includes the first indication information and the second indication information, the terminal may send the preamble in the access message on the first time-frequency resource indicated by the first indication information, scramble the load in the access message according to the RNTI, and send the scrambled load on the second time-frequency resource indicated by the second indication information. Therefore, the terminal may be instructed by using the system message to send the preamble and the scrambled load. Compared with instructing the terminal by using the system message to send the preamble and instructing the terminal by using an msg2 to send an msg3, this manner has the advantages that steps of a random access process may be reduced, thereby improving the random access efficiency.

Multiple preambles sent by the terminal are received to increase the probability that the preamble sent by the terminal is received by the access network device, thereby increasing the success rate of random access.

An exemplary embodiment of the present disclosure provides a terminal, which may implement a random access method provided in the present disclosure. The terminal includes a processor and a memory configured to store signaling executable by the processor.

The processor is configured to: receive a system message sent by an access network device, the system message including first indication information and second indication information, the first indication information being configured to indicate a first time-frequency resource for sending a preamble in an access message and the second indication information being configured to indicate a second time-frequency resource for sending a load in the access message; send the preamble on the first time-frequency resource; and scramble the load in the access message according to an RNTI and send the scrambled load on the second time-frequency resource.

An exemplary embodiment of the present disclosure provides an access network device, which may implement a random access method provided in the present disclosure. The access network device includes a processor and a memory configured to store signaling executable by the processor.

The processor is configured to: generate a system message, the system message including first indication information and second indication information, the first indication information being configured to indicate a first time-frequency resource for sending a preamble in an access message and the second indication information being configured to indicate a second time-frequency resource for sending a load in the access message; send the system message to a terminal; receive the preamble on the first time-frequency resource; and receive a scrambled load on the second time-frequency resource and descramble the scrambled load according to an RNTI to obtain the load in the access message.

Figure 8:
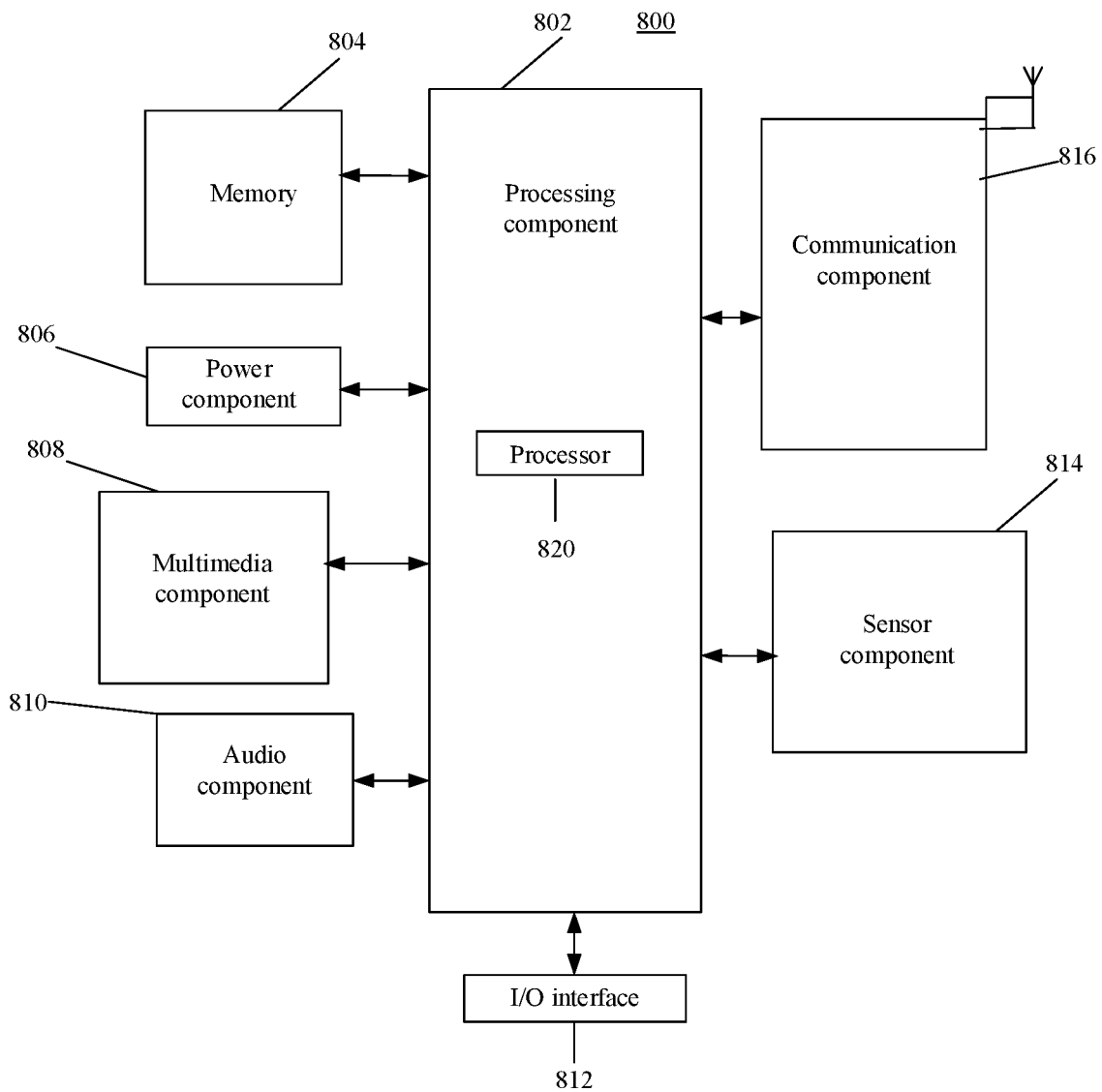
FIG. 8 is a block diagram of an apparatus for random access, according to an exemplary embodiment.

FIG. 8 is a block diagram of an apparatus 800 for random access, according to an exemplary embodiment. For example, the apparatus 800 may be a mobile phone, a computer, a digital broadcast terminal, a messaging device, a gaming console, a tablet, a medical device, exercise equipment, a personal digital assistant and the like.

Referring to FIG. 8, the apparatus 800 may include one or more of the following components: a processing component 802, a memory 804, a power component 806, a multimedia component 808, an audio component 810, an Input/Output (I/O) interface 812, a sensor component 814, or a communication component 816.

The processing component 802 typically controls overall operations of the apparatus 800, such as the operations associated with display, telephone calls, data communications, camera operations, and recording operations. The processing component 802 may include one or more processors 820 to execute instructions to perform all or part of the steps in the above-mentioned method. Moreover, the processing component 802 may include one or more modules which facilitate interaction between the processing component 802 and other components. For instance, the processing component 802 may include a multimedia module to facilitate interaction between the multimedia component 808 and the processing component 802.

The memory 804 is configured to store various types of data to support the operation of the apparatus 800. Examples of such data include instructions for any applications or methods operated on the apparatus 800, contact data, phonebook data, messages, pictures, video, and the like. The memory 804 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 806 provides power for various components of the apparatus 800. The power component 806 may include a power management system, one or more power supplies, and other components associated with generation, management and distribution of power for the apparatus 800.

The multimedia component 808 includes a screen providing an output interface between the apparatus 800 and a user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action, but also detect a period of time and a pressure associated with the touch or swipe action. In some embodiments, the multimedia component 808 includes a front camera and/or a rear camera. The front camera and/or the rear camera may receive external multimedia data when the apparatus 800 is in an operation mode, such as a photographing mode or a video mode. Each of the front camera and the rear camera may be a fixed optical lens system or have focusing and optical zooming capabilities.

The audio component 810 is configured to output and/or input an audio signal. For example, the audio component 810 includes a Microphone (MIC). The MIC is configured to receive an external audio signal when the apparatus 800 is in an operation mode, such as a call mode, a recording mode and a voice recognition mode. The received audio signal may further be stored in the memory 804 or sent through the communication component 816. In some embodiments, the audio component 810 further includes a speaker configured to output the audio signal.

The I/O interface 812 provides an interface between the processing component 802 and peripheral interface modules, such as a keyboard, a click wheel, buttons, and the like. The buttons may include, but are not limited to: a home button, a volume button, a starting button, and a locking button.

The sensor component 814 includes one or more sensors configured to provide status assessments in various aspects for the apparatus 800. For instance, the sensor component 814 may detect an on/off status of the apparatus 800 and relative positioning of components, such as a display and small keyboard of the apparatus 800. The sensor component 814 may further detect a change in a position of the apparatus 800 or a component of the apparatus 800, presence or absence of contact between the user and the apparatus 800, orientation or acceleration/deceleration of the apparatus 800 and a change in temperature of the apparatus 800. The sensor component 814 may include a proximity sensor configured to detect presence of an object nearby without any physical contact. The sensor component 814 may also include a light sensor, such as a Complementary Metal Oxide Semiconductor (CMOS) or Charge Coupled Device (CCD) image sensor, configured for use in an imaging application. In some embodiments, the sensor component 814 may also include an acceleration sensor, a gyroscope sensor, a magnetic sensor, a pressure sensor, or a temperature sensor.

The communication component 816 is configured to facilitate wired or wireless communication between the apparatus 800 and other devices. The apparatus 800 may access a communication-standard-based wireless network, such as a Wireless Fidelity (WiFi) network, a 2nd-Generation (2G) or 3rd-Generation (3G) network, or a combination thereof. In an exemplary embodiment, the communication component 816 receives a broadcast signal or broadcast associated information from an external broadcast management system through a broadcast channel. In an exemplary embodiment, the communication component 816 further includes a Near Field Communication (NFC) module to facilitate short-range communications.

In an exemplary embodiment, the apparatus 800 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the above-mentioned method.

In an exemplary embodiment, there is also provided a non-transitory computer-readable storage medium including instructions, such as included in the memory 804, executable by the processor 820 of the apparatus 800 for performing the above-mentioned method. For example, the non-transitory computer-readable storage medium may be a ROM, a Random Access Memory (RAM), a Compact Disc Read-Only Memory (CD-ROM), a magnetic tape, a floppy disc, an optical data storage device, and the like.

According to a non-transitory computer-readable storage medium, when an instruction in the storage medium is executed by a processor of a mobile terminal, the mobile terminal may execute the above-mentioned random access method.

Figure 9:
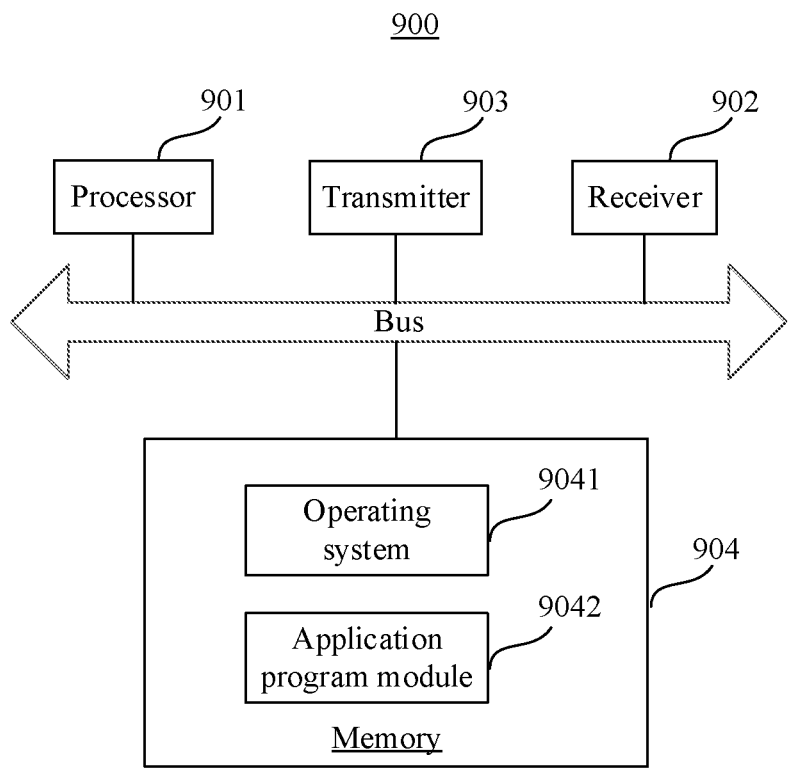
FIG. 9 is a block diagram of a random access apparatus, according to an exemplary embodiment.

FIG. 9 is a block diagram of a random access apparatus 900, according to an exemplary embodiment. For example, the random access apparatus 900 may be an access network device. As shown in FIG. 9, the random access apparatus 900 may include a processor 901, a receiver 902, a transmitter 903, and a memory 904. The receiver 902, the transmitter 903 and the memory 904 are connected with the processor 901 through a bus respectively.

The processor 901 includes one or more than one processing core. The processor 901 runs a software program and a module to execute the method executed by the access network device in the random access methods provided in the embodiments of the present disclosure. The memory 904 may be configured to store the software program and the module. Specifically, the memory 904 may store an operating system 9041 and an application program module 9042 required by at least one function. The receiver 902 is configured to receive communication data sent by another device. The transmitter 903 is configured to send communication data to the other device.

Figure 10:
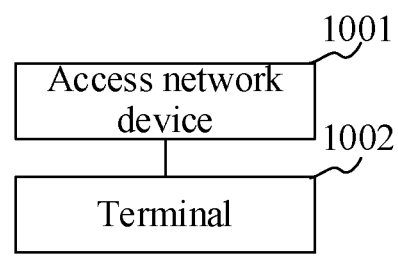
FIG. 10 is a block diagram of a random access system, according to an exemplary embodiment.

FIG. 10 is a block diagram of a random access system, according to an exemplary embodiment. As shown in FIG. 10, the random access system includes an access network device 1001 and a terminal 1002.

The access network device 1001 is configured to execute the random access method executed by the access network device in the embodiments shown in FIGS. 2 to 5.

The terminal 1002 is configured to execute the random access method executed by the terminal in the embodiments shown in FIGS. 2 to 5.

An exemplary embodiment of the present disclosure provides a computer-readable storage medium. At least one instruction, at least one segment of program, a code set or an instruction set is stored in the storage medium. The at least one instruction, the at least one segment of program, the code set or the instruction set is loaded and executed by a processor to implement the above-mentioned random access method.

Other implementation solutions of the present disclosure will be apparent to those skilled in the art from consideration of the specification and practice of the present disclosure. This present disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A random access method, comprising:
receiving, by a terminal, a system message sent by an access network device, the system message comprising first indication information and second indication information, the first indication information being configured to indicate a first time-frequency resource for sending a preamble in an access message and the second indication information being configured to indicate a second time-frequency resource for sending a load in the access message;
sending, by the terminal, the preamble on the first time-frequency resource; and
scrambling, by the terminal, the load in the access message according to a Radio Network Temporary Identifier (RNTI) and sending the scrambled load on the second time-frequency resource;
wherein the system message further comprises a Synchronization Signal Block (SSB);
wherein the method further comprises: selecting, by the terminal, an SSB from SSBs in the system message and acquiring Reference Signal Receiving Power (RSRP) of the selected SSB; and
the sending, by the terminal, the scrambled load on the second time-frequency resource comprises: determining, by the terminal, predetermined sending power according to the RSRP, and sending the scrambled load on the second time-frequency resource according to the predetermined sending power, wherein the predetermined sending power is greater than or equal to the RSRP.

2. The method of claim 1, wherein, in response to determining that the terminal is in an uplink to-be-synchronized state or about to send scheduling signaling of requesting for an uplink, the RNTI is a Cell-RNTI (C-RNTI), and the scrambling, by the terminal, the load in the access message according to the RNTI comprises:
acquiring, by the terminal, the C-RNTI allocated by the access network device; and
scrambling, by the terminal, the load in the access message according to the C-RNTI.

3. The method of claim 1, wherein, in response to determining that the terminal is in an initial random access state, the RNTI is a Random Access-RNTI (RA-RNTI), and the scrambling, by the terminal, the load in the access message according to the RNTI comprises:
calculating, by the terminal, the RA-RNTI according to the first indication information; and
scrambling, by the terminal, the load in the access message according to the RA-RNTI.

4. The method of claim 1, wherein a time-domain resource in the first time-frequency resource and a time-domain resource in the second time-frequency resource are discontinuous.

5. The method of claim 1, wherein the first time-frequency resource comprises multiple time-frequency sub-resources, each time-frequency sub-resource is configured to send a preamble, and the sending, by the terminal, the preamble on the first time-frequency resource comprises:
sending, by the terminal, a preamble on each time-frequency sub-resource in the first time-frequency resource.

6. The method of claim 1, wherein the system message further comprises first Modulation and Coding Scheme (MCS) information and second MCS information, and a numerical value of the second MCS information is greater than or equal to a numerical value of the first MCS information;
wherein the sending, by the terminal, the preamble on the first time-frequency resource comprises: sending, by the terminal, the preamble on the first time-frequency resource according to the first MCS information; and
the sending, by the terminal, the scrambled load on the second time-frequency resource comprises: sending, by the terminal, the scrambled load on the second time-frequency resource according to the second MCS information.

7. The method of claim 6, wherein the numerical value of the first MCS information indicates a transmission rate of the preamble, and the numerical value of the second MCS information indicates a transmission rate of the scrambled load.

8. The method of claim 1, wherein the system message comprises a System Information Block 1 (SIB1), and the first indication information and the second indication information are included in the SIB1.

9. The method of claim 1, wherein the system message comprises a SIB1 and a SIBn, the first indication information is included in the SIB1, the second indication information is included in the SIBn, and n is a positive integer.

10. A random access method, comprising:
generating, by an access network device, a system message, the system message comprising first indication information and second indication information, the first indication information being configured to indicate a first time-frequency resource for sending a preamble in an access message and the second indication information being configured to indicate a second time-frequency resource for sending a load in the access message;
sending, by the access network device, the system message to a terminal;
receiving, by the access network device, the preamble on the first time-frequency resource; and
receiving, by the access network device, a scrambled load on the second time-frequency resource and descrambling the scrambled load according to a Radio Network Temporary Identifier (RNTI) to obtain the load in the access message;
wherein the system message further comprises a Synchronization Signal Block (SSB), and the receiving, by the access network device, the scrambled load on the second time-frequency resource comprises:
receiving, on the second time-frequency resource by the access network device, the scrambled load sent according to predetermined sending power, the predetermined sending power being determined by the terminal, after selecting an SSB from SSBs in the system message and acquiring Reference Signal Receiving Power (RSRP) of the selected SSB, according to the RSRP, wherein the predetermined sending power is greater than or equal to the RSRP.

11. The method of claim 10, wherein, in response to determining that the terminal is in an uplink to-be-synchronized state or about to send scheduling signaling of requesting for an uplink, the RNTI is a Cell-RNTI (C-RNTI), and the descrambling, by the access network device, the scrambled load according to the RNTI to obtain the load in the access message comprises:
acquiring, by the access network device, the C-RNTI allocated to the terminal; and
descrambling, by the access network device, the scrambled load according to the C-RNTI to obtain the load in the access message.

12. The method of claim 10, wherein, in response to determining that the terminal is in an initial random access state, the RNTI is a Random Access-RNTI (RA-RNTI), and the descrambling, by the access network device, the scrambled load according the an RNTI to obtain the load in the access message comprises:

calculating, by the access network device, the RA-RNTI according to the first indication information; and
descrambling, by the access network device, the scrambled load according to the RA-RNTI to obtain the load in the access message.

13. The method of claim 10, wherein a time-domain resource in the first time-frequency resource and a time-domain resource in the second time-frequency resource are discontinuous.

14. The method of claim 10, wherein the first time-frequency resource comprises multiple time-frequency sub-resources, each time-frequency sub-resource is configured to send a preamble, and the receiving, by the access network device, the preamble on the first time-frequency resource comprises:
receiving, by the access network device, a preamble on each time-frequency sub-resource in the first time-frequency resource.

15. The method of claim 10, wherein the system message further comprises first Modulation and Coding Scheme (MCS) information and second MCS information, and a numerical value of the second MCS information is greater than or equal to a numerical value of the first MCS information;
wherein the receiving, by the access network device, the preamble on the first time-frequency resource comprises: receiving, by the access network device, the preamble on the first time-frequency resource according to the first MCS information; and
the receiving, by the access network device, the scrambled load on the second time-frequency resource comprises: receiving, by the access network device, the scrambled load on the second time-frequency resource according to the second MCS information.

16. The method of claim 10, wherein the system message comprises a System Information Block 1 (SIB1), and the first indication information and the second indication information are included in the SIB1.

17. The method of claim 10, wherein the system message comprises a SIB1 and a SIBn, the first indication information is included in the SIB1, the second indication information is included in the SIBn, and n is a positive integer.

18. An access network device implementing operations of the random access method of claim 10, comprising:
a processor; and
a memory configured to store instructions executable by the processor;
wherein the processor is configured to execute the instructions to:
generate a system message, the system message comprising first indication information and second indication information, the first indication information being configured to indicate a first time-frequency resource for sending a preamble in an access message and the second indication information being configured to indicate a second time-frequency resource for sending a load in the access message;
send the system message to a terminal;
receive the preamble on the first time-frequency resource; and
receive a scrambled load on the second time-frequency resource and descramble the scrambled load according to a Radio Network Temporary Identifier (RNTI) to obtain the load in the access message;
wherein the system message further comprises a Synchronization Signal Block (SSB);

wherein the processor is further configured to execute the instructions to: in response to receiving the scrambled load on the second time-frequency resource, receive, on the second time-frequency resource, the scrambled load sent according to predetermined sending power, the predetermined sending power being determined by the terminal, after selecting an SSB from SSBs in the system message and acquiring Reference Signal Receiving Power (RSRP) of the selected SSB, according to the RSRP, wherein the predetermined sending power is greater than or equal to the RSRP.

19. The method of claim 15, wherein the numerical value of the first MCS information indicates a transmission rate of the preamble, and the numerical value of the second MCS information indicates a transmission rate of the scrambled load.

20. A terminal, comprising:
a processor; and
a memory configured to store instructions executable by the processor;
wherein the processor is configured to execute the instructions to:
receive a system message sent by an access network device, the system message comprising first indication information and second indication information, the first indication information being configured to indicate a first time-frequency resource for sending a preamble in an access message and the second indication information being configured to indicate a second time-frequency resource for sending a load in the access message;
send the preamble on the first time-frequency resource; and
scramble the load in the access message according to a Radio Network Temporary Identifier (RNTI) and send the scrambled load on the second time-frequency resource;
wherein the system message further comprises a Synchronization Signal Block (SSB);
wherein the processor is further configured to execute the instructions to: select an SSB from SSBs in the system message and acquire Reference Signal Receiving Power (RSRP) of the selected SSB; and
in response to sending the scrambled load on the second time-frequency resource, determine predetermined sending power according to the RSRP and send the scrambled load on the second time-frequency resource according to the predetermined sending power, wherein the predetermined sending power is greater than or equal to the RSRP.

* * * * *